United States Patent [19]

Hefner, Jr. et al.

[11] 4,363,907
[45] Dec. 14, 1982

[54] COHALOGENATION PROCESS FOR POLYESTERS

[75] Inventors: Robert E. Hefner, Jr.; Hans R. Friedli; Mark J. Hazelrigg, Jr., all of Lake Jackson, Tex.

[73] Assignee: The Dow Chemical Company, Midland, Mich.

[21] Appl. No.: 283,315

[22] Filed: Jul. 14, 1981

[51] Int. Cl.$^3$ .................... C08G 63/02; C08G 63/68; C08G 63/76; C08G 79/02
[52] U.S. Cl. .................................. 528/287; 525/438; 525/445; 528/298; 528/299; 528/304
[58] Field of Search ................ 525/438, 445; 528/287, 528/298, 299, 304

[56] References Cited

U.S. PATENT DOCUMENTS

| | | | |
|---|---|---|---|
| 3,412,070 | 11/1968 | Jakob et al. | 528/299 |
| 3,417,063 | 12/1968 | Dunkel | 528/299 |
| 3,575,927 | 4/1971 | Jackson et al. | 528/98 |
| 4,016,142 | 4/1977 | Alexander et al. | 525/445 |
| 4,029,848 | 6/1977 | Nelson | 428/430 |
| 4,117,030 | 9/1978 | Nelson | 260/837 R |
| 4,167,542 | 9/1979 | Nelson | 525/445 |
| 4,223,432 | 11/1980 | Curtis | 528/298 |
| 4,246,367 | 1/1981 | Curtis | 525/49 |

FOREIGN PATENT DOCUMENTS 1195902  6/1970  United Kingdom .

OTHER PUBLICATIONS

Boeing, "Unsaturated Polyesters", Structure and Properties (1964), pp. 173–183, Elsevier Publishing Co.

*Primary Examiner*—H. S. Cockeram

[57] ABSTRACT

Cohalogenation of unsaturated polyesters containing pendant unsaturation and a dicyclopentadienyl ester of an $\alpha,\beta$-unsaturated carboxylic acid is carried out at room temperature or lower to simultaneously and selectively halogenate the non $\alpha,\beta$-unsaturation. These materials have utility in plastics, such as fire-retardant castings.

17 Claims, No Drawings

COHALOGENATION PROCESS FOR POLYESTERS

BACKGROUND OF THE INVENTION

Unsaturated polyesters find extensive utility in a wide variety of applications. Being essentially organic in nature such polyesters are all combustible to greater or lesser extent. Many different approaches and techniques have been developed to improve the resistance of polyesters to ignition or to propagation of flame. Typical are the use of inorganic fillers, organic fire retardants, and the chemical modification of the diacid, the diol or the reactive diluent employed.

In recent years there has been developed a class of dicyclopentadiene modified unsaturated polyesters. These polyesters have a unique spectrum of properties, but, as expected, are combustible. One technique employed to improve their fire resistance is to brominate the pendant cyclopentene double bond of the dicyclopentadiene in the polyester. That generally results in less than the necessary amount of bromine for many applications. It has been found that the necessary bromine can be incorporated by including a brominated reactive diluent such as dibromodicyclopentadiene acrylate. However, that requires a separate bromination step.

It would be desirable to have a process whereby dicyclopentadiene acrylate or its equivalent could be blended with the dicyclopentadiene modified unsaturated polyester and both components brominated to the desired extent without causing bromination of the other parts of the molecule.

SUMMARY OF THE INVENTION

Halogenated curable resin compositions are prepared from a blend of an unsaturated polyester containing pendant unsaturation and a dicyclopentadienyl ester of an unsaturated carboxylic acid by the process of halogenating that blend at room temperature or less to the desired level of halogen, after which a polymerization inhibitor-stabilizer is added, any solvent removed and a reactive diluent added.

By the term "pendant unsaturation" is meant olefinic unsaturation that is not from the $\alpha,\beta$-unsaturated entities of the polyester and the dicyclopentadienyl ester. The pendant unsaturation is not conjugated with carboxyl groups and is not present in the polyester for the purpose of curing into the final product.

DETAILED DESCRIPTION OF THE INVENTION

The composition for which the present process is well adapted are blends of certain unsaturated polyesters and of dicyclopentadienyl esters of unsaturated carboxylic acids.

Unsaturated polyesters are prepared by methods known in the art. Typically, an unsaturated polycarboxylic acid, anhydride or mixture, usually a dicarboxylic acid, dicarboxylic anhydride or mixture, is condensed with a polyhydric alcohol, typically a saturated diol. Many variations are employed. For example, part of the unsaturated dicarboxylic acid may be replaced by a saturated dicarboxylic acid and/or a halogenated saturated or unsaturated dicarboxylic acid. The anhydrides of such acids are commonly employed in the preparation of the polyesters. Also, the dihydric alcohol may be unsaturated in whole, or in part. The dihydric alcohol may also contain halogen, as for example, dibromoneopentyl glycol.

The $\alpha,\beta$-unsaturation derived from such $\alpha,\beta$-unsaturated diacids becomes a part of the polymer chains. Such unsaturation is generally undesirable to halogenate and, when halogenated, alters the curability and properties of the polyester. Thus, the unsaturated polyesters useful in the present invention are those containing that polymer chain $\alpha,\beta$-unsaturation from the $\alpha,\beta$-unsaturated acid and, in addition, containing pendant unsaturation.

Useful classes of unsaturated polyesters are those which have been modified with DCPD or other cycloalkylenically unsaturated compounds, such as carbic anhydride or tetrahydrophthalic anhydride.

A class of unsaturated polyesters modified with dicyclopentadiene is well adapted for use in the cohalogenation procedure. Such polyesters can be prepared in a variety of techniques. A preferred method, which for purposes of this application is called the hydrolysis method, involves the hydrolysis of a portion of maleic anhydride with a fraction of equivalent of water at an elevated temperature of from about 60° to 130° C. A second fractional equivalent of water and of dicyclopentadiene (DCPD) is added, followed at intervals of additional fractional equivalents of DCPD until the desired amount of DCPD has been added. The temperature is raised to complete the reaction. The product is principally DCPD monomaleate plus maleic acid and maleic anhydride. To that mix is added a glycol and the polyesterification carried out in a usual manner. The result is an unsaturated polyester having pendant dicyclopentadienyl groups.

Many other embodiments of the hydrolysis method are useful. In an alternate embodiment, all of the maleic anhydride is hydrolyzed followed by addition of all or increments of the DCPD. Also all of the water and maleic acid or anhydride or mixtures thereof may be mixed and slowly heated to achieve the hydrolysis.

In another alternate, but less preferred embodiment, the DCPD, maleic anhydride, glycol and water are reacted simultaneously to produce a polyester.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

These concentrates have as the main reactive components about 60 to about 90 percent by weight of dicyclopentadiene, about 5 to about 30 percent by weight of the mixed Diels-Alder dimers of diolefins such as butadiene, cis and trans piperylene, isoprene, cyclopentadiene and methyl cyclopentadiene. The remainder of these concentrates generally comprise residual $C_5$ hydrocarbons and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

Either the $C_{10}$ concentrate or the relatively pure DCPD may be employed in preparing the modified polyesters.

Similar pendant unsaturation, in the respect of ease of halogenation, can be inserted into a polyester by employing tetrahydrophthalic anhydride as a part of the dicarboxylic function. In such instance that anhydride, an unsaturated dicarboxylic acid and a glycol are cooked together by conventional polyester preparation techniques.

A similar result is obtained when carbic anhydride is employed as part of the diacid in making the polyester. The carbic anhydride may be generated in situ by the thermal cracking of DCPD. Methyl carbic anhydride is also useful.

Other techniques are known for modifying unsaturated polyesters to obtain such products having pendant unsaturation. A number of such techniques are taught in British Pat. No. 1,195,902 wherein the DCPD is included in the polyester through etherification as well as esterification.

Yet another class of useful unsaturated polyesters are those described above which have been further modified with a phosphonate terminal group. These polyesters are conveniently prepared by reacting the modified polyester, wherein one or both ends are hydroxyl terminated, with a dialkoxyalkyl phosphonate, such as dimethoxymethyl phosphonate, with a catalyst, such as dibutyltin oxide and with the removal of methanol. The product is a monomethoxy methyl phosphonate terminated unsaturated polyester. Such phosphonate groups improve the resistance of the unsaturated polyesters to flame propagation and also reduce the volume of smoke produced when ignited.

The unsaturated polyesters are blended with a comparatively lower viscosity DCPD unsaturated ester. That ester if DCPD acrylate; DCPD methacrylate; DCPD alkylenoxyacrylate or bis(DCPD)fumarate. This ester lowers the viscosity of the blend and provides pendant unsaturation and monomer sites. In the past, it was the practice to separately halogenate the polyester and this ester and blend the two into the final product. The primary advantage of this invention is the simultaneous and selective cohalogenation of ester and polyester.

The polyester/ester blend may be further diluted with a vinyl monomer, such as styrene, vinyl toluene, t-butyl styrene, acrylate esters or other known monovinyl monomer, to result in still greater viscosity reduction and greater cross-linking potential. Such monomers, commonly called reactive diluents, are most conveniently added to the blend following cohalogenation.

The cohalogenation process of this invention is a low temperature addition of halogen, preferably bromine, to the pendant unsaturation. The amount of halogen may be adjusted to a desired level by means of the amount of pendant unsaturation introduced into the polyester and/or the amount of ester employed. Further adjustment of the amount of introduced halogen can be achieved through the amount of halogen employed in the process. Generally, a bromine content of at least 22 weight percent, preferably 22 to 24 weight peercent, is required for a cured formulation to pass standard flame spread tests, as for example, ASTM test E-84-77.

The cohalogenation process is carried out in a solvent for the unsaturated polyester and the ester. One useful solvent is methylene chloride. The solution is chilled to a temperature below 25° C. and preferably below 0° C. and most preferably to about minus 20° C.

The chilled solution is sparged with nitrogen and the desired halogen, preferably bromine, is added dropwise with stirring while maintaining the low temperature. The halogen adds simultaneously to the pendant double bonds of both the polyester and the ester without halogenating the $\alpha,\beta$-unsaturation. It is frequently desirable to maintain the reaction mix at the low temperature with stirring for a period of at least about one half hour.

While still chilled, it is desirable to add a vinyl polymerization inhibitor, such as hydroquinone, methyl ether of hydroquinone, t-butylcatechol or other known inhibitor. That inhibitor may be added by dissolving the inhibitor in a small amount of styrene or, more preferably, the inhibitor may be added followed by the styrene. It may also be of advantage to add an oxirane compound, such as an epoxide or a polyepoxide, as a hydrohalide scavenger to aid in stabilization of the blend.

The reaction is then allowed to warm to room temperature and the solvent, if any be used, removed as by distillation under reduced pressure or by other known technique.

The reactive diluent is then added and mixed thoroughly with the cohalogenated unsaturated polyester/ester blend.

The following examples illustrate the inventive concept and describe the best mode for carrying out the invention.

In the examples DCPD is dicyclopentadiene and DCPD-A is dicyclopentadiene acrylate.

By DCPD-A (monomer grade) is meant a distilled product containing greater than 99 percent DCPD-A with a trace of DCPD-diacrylate and a trace of $C_{15}$ and $C_{20}$ acrylates. By DCPD-A (undistilled) is meant a product of about 95 percent DCPD-A plus about 2 percent DCPD-diacrylate, 3 percent $C_{15}$ and $C_{20}$ acrylates and a trace of acrylic polymers.

EXAMPLE 1

(a) A polyester alkyd was prepared from 1.8 moles tetrahydrophthalic anhydride, 1.2 moles maleic anhydride and 3.3 moles propylene glycol. The ingredients were thoroughly mixed and heated at 200° C. with the removal of water until an acid number of 35 was attained.

To 321.34 grams of the polyester was added 31.38 grams DCPD-A (monomer grade) and the blend dissolved in 1500 milliliters methylene chloride; the temperature of the solution mix reduced to minus 20° C., held under nitrogen, and 168.39 grams bromine added dropwise over 125 minutes. A one hour post reaction at reduced temperature is completed. The resultant product had two bromine substituents on the tetrahydrophthalyl group and two bromines on the cyclopentene group of the DCPD-A.

An inhibitor-stabilizer combination was added in sequence of first 0.02 percent t-butylcatechol, then 1 percent styrene and 2.0 percent of the diglycidyl ether of a polyglycol (sold commercially as D.E.R. ® 736 epoxy resin) having an epoxy equivalent weight of 175–205.

The solvent was removed under reduced pressure and 211.03 grams styrene added.

(b) A comparative formulation was prepared composed of 57 percent of the polyester alkyd, 5.56 percent of DCPD-A and 37.44 percent styrene.

EXAMPLE 2

(a) A polyester was prepared by first reacting 2.4 moles of 98 percent DCPD with 4.0 moles maleic anhydride and 2.8 moles water. The reaction is carried out by melting the maleic anhydride at 70° C., adding ¾ of the water and then about 2 minutes later, adding a quarter of the amount of DCPD. After about 20 minutes a second quarter of the DCPD is added with the remainder of the water. The remaining DCPD is added in 2 equal amounts at 15 minute intervals after which the reactor is heated to 110° C. and maintained for 30 minutes.

That DCPD monomaleate, excess maleic anhydride and maleic acid mixture is reacted with 3.12 moles propylene glycol and heated at 160° C. with removal of water for 2 hours, followed by 205° C. to an acid number of 33.

To 315.66 grams of the polyester was added 48.02 grams DCPD-A (monomer grade) and 1500 milliliters methylene chloride. The solution was chilled to minus 20° C., held under nitrogen, and 165.42 grams bromine added dropwise over 39 minutes followed by one hour post reaction at reduced temperature. The resultant product had two bromine substituents on the cyclopentene groups of the DCPD of the polyester and the monounsaturated ester.

The inhibitor-stabilizer combination of the previous example was added. The solvent was removed under reduced pressure and 190.11 grams styrene added.

(b) A comparative formulation was prepared from 57 percent of the polyester, 8.67 percent of DCPD-A and 34.33 percent of styrene.

EXAMPLE 3

(a) A polyester was prepared according to the procedure of Example 1 using an undistilled DCPD-A (molecular weight=222 grams/mole). To the polyester as therein prepared was added 34.1 grams DCPD-A and 1500 milliliters methylene chloride. The solution was chilled and 168.39 grams bromine added dropwise over 94 minutes and postreacted at reduced temperature for one hour.

The inhibitor-stabilizer combination was added. The solvent was removed and 208.11 grams styrene added.

(b) A comparative formulation was prepared from 57 percent of the polyester, 6.05 percent of the undistilled DCPD-A and 36.95 percent styrene.

EXAMPLE 4

(a) A polyester as prepared according to the procedure of Example 2 using 3.8 moles maleic anhydride in place of the 4.0 moles of that example. After reaction withh propylene glycol, to an acid number of 36, the reaction was cooled to 160° C. and 0.1 percent dibutyltin oxide added followed by 0.2 mole dimethoxymethyl phosphonate. The reaction was carried out one hour at 160° C. with removal of methanol. The temperature was increased until 185° C. was reached and the acid number was 33.

To 317.39 grams polyester was added 49.19 grams DCPD-A (monomer grade) and 1500 milliliters methylene chloride. The mix was chilled to minus 20° C. and held under nitrogen. There was added 166.33 grams bromine dropwise over 74 minutes and postreacted for one hour. The inhibitor-stabilizer combination was added followed by 190.25 grams styrene.

(b) A comparative formulation was prepared to include 57 percent of the phosphonate end-capped polyester, 8.83 percent DCPD-A and 34.17 percent styrene.

EXAMPLE 5

Each of the compositions of the invention and the comparative formulations of the previous examples were tested by conventional procedures to determine various physical and mechanical properties.

The Brookfield viscosity was measured at room temperature.

Heat distortion bars were cured at room temperature with 0.1 percent cobalt naphthenate (6 percent); 1.0 percent methyl ethyl ketone peroxide and 0.02 percent dimethylaniline. The bars were post cured for 2 hours at 93° C.

Unfilled, clear castings for tensile and flexural strength evaluations were made with a cure system of 1.0 percent benzoyl peroxide and 0.01 percent dimethylaniline cured at room temperature followed by a 2 hour post cure at 93° C.

In the following table:

$Br_2$ is in moles.
Viscosity is Brookfield viscosity in cps at 25° C.
HDT is heated distortion temperature in degrees F.
SPI gel time and cure time are in minutes and the maximum exotherm is in degrees C.
Tensile strength is psi $\times 10^3$.
Elongation is in percentage.
Flexural strength is psi $\times 10^4$.

TABLE I

| Example | $Br_2$ | Viscosity | HDT | SPI Gel - 84° C. Gel Time | SPI Gel - 84° C. Cure Time | SPI Gel - 84° C. Max. Exotherm | Barcol Hardness | Tensile Strength | Elong. | Flexural Strength |
|---|---|---|---|---|---|---|---|---|---|---|
| 1(a) | 1.06 | 372.0 | 145 | 5.7 | 9.0 | 153 | 44.4 | 7.102 | 1.74 | 1.0480 |
| 1(b) | — | 177.5 | 180 | 4.0 | 6.1 | 204 | 45.2 | 8.519 | 1.88 | 1.8103 |
| 2(a) | 0.80 | 675 | 213 | 5.3 | 7.5 | 182 | 49.1 | 3.002 | 0.55 | 0.8168 |
| 2(b) | — | 60 | 219 | 5.5 | 7.3 | 215 | 48.1 | 3.117 | 0.71 | 0.8969 |
| 3(a) | 1.06 | 594 | 126 | 5.4 | 8.5 | 165 | 42.8 | 7.034 | 1.80 | 1.3429 |
| 3(b) | — | 283.5 | 168 | 3.7 | 5.8 | 209 | 43.7 | 8.583 | 1.78 | 1.7897 |
| 4(a) | 1.04 | 195 | 178 | 5.8 | 8.4 | 165 | 46.7 | 3.336 | 0.46 | 0.7008 |
| 4(b) | — | 35 | 189 | 8.5 | 11.4 | 218 | 45.6 | 3.608 | 0.77 | 0.8048 |

In the table, it is noted that the viscosity of the brominated embodiments is in each instance higher than the nonbrominated equivalent.

The lack of significant change is SPI gel and cure times indicates that little, if any, bromination of the fumarate unsaturation of the polyester has occurred and substantiates the selectivity of the bromination.

The heat distortion temperature of Examples 1 and 3 show a significant difference between brominated and nonbrominated species. Examples 2 and 4 do not show that difference. In the other properties of Barcol hardness, tensile strength, flexural strength and elongation, the values of the brominated and nonbrominated compositions are similar.

EXAMPLE 6

Oxygen index, (OI), values were determined by ASTM D2863-76 for all the compositions. The results are in Table II.

TABLE II

| Example | Br₂ | OI |
|---|---|---|
| 1(a) | 1.06 | 26.30 |
| 1(b) | — | ATM |
| 2(a) | 0.80 | 26.50 |
| 2(b) | — | ATM |
| 3(a) | 1.06 | 26.35 |
| 3(b) | — | ATM |
| 4(a) | 1.04 | >38.20 |
| 4(b) | — | ATM |

All of the nonbrominated polyesters possessed atmospheric OI values indicative of the total combustion in ambient air. The brominated compositions of Examples 1, 2 and 3 are almost identical reflecting the fact that all have the same 23 percent bromine substitution. The brominated composition of Example 4 has a significantly enhanced OI value indicating the function of the phosphorus end cap together with the bromine substitution.

The nonbrominated compositions of 1, 2 and 3 all burned with black smoke without leaving a residue. That of Example 4 burned with reduced smoke and was extinguished by thick ash formations at values below the OI.

EXAMPLE 7

(a) A polyester was prepared according to the procedure of Example 4 using, in place of the stated ingredients of that example, 7.6 moles of maleic anhydride, 4.8 moles of a DCPD concentrate (containing 0.52 percent lights, 16.84 percent codimers, 82.60 percent DCPD, 0.04 percent trimers) and 5.6 moles water. A mixture of 2.08 moles diethylene glycol and 4.16 moles ethylene glycol was used. After reaction with ethylene and diethylene glycol, 0.1 percent dibutylin oxide was added followed by 0.4 mole dimethoxymethyl phosphonate. The final acid number was 28.

To 382.35 grams polyester was added 65.20 grams undistilled DCPD-A and 1100 milliliters methylene chloride. The solution was chilled to minus 20° C. and held under nitrogen. There was added 200.37 grams bromine dropwise over 37 minutes and post reacted at reduced temperaturee for one hour. The initiator-stabilizer combination was added followed by 223.24 grams styrene.

(b) A comparative formulation was prepared from 57 percent of the polyester, 9.72 percent of the undistilled DCPD-A and 33.28 percent styrene.

(c) A comparative brominated polyester formulation was prepared. To 382.35 grams of the polyester was added 1150 milliliters methylene chloride. The solution was chilled to minus 20° C. and held under nitrogen. There was added 153.43 grams bromine dropwise over 47 minutes and post reacted at reduced temperature for one hour. The inhibitor-stabilizer combination was added followed by 288.44 grams styrene.

EXAMPLE 8

(a) A polyester was prepared by reacting 3.6 moles of 98 percent DCPD with 5.7 moles maleic anhydride and 4.2 moles water. The reaction is carried out by heating the maleic anhydride to 170° C. followed by the addition of 0.30 mole DCPD after which the reactor is heated to 180° C. and held for 30 minutes then cooled to 70° C. Three fourths of the water was added to the reactor and then about 2 minutes later, a quarter of the amount of DCPD. After about 20 minutes, a second quarter of the DCPD is added with the remainder of the water. The remaining DCPD is added in two equal amounts at 15 minute intervals after which the reactor is heated to 110° C. and maintained for 30 minutes.

That DCPD monomaleate, carbic anhydride and acid plus the excess maleic anhydride and maleic acid mixture is reacted with 2.34 moles propylene glycol and 2.34 moles dipropylene glycol and heated at 160° C. with removal of the water for 2 hours, followed by 205° C. to an acid number of 32. After reaction with the propylene glycol and dipropylene glycol, the reaction was cooled to 160° C. and 0.1 percent dibutyltin oxide added then 0.3 mole dibutyloxy butyl phosphonate. The reaction was carried out one hour at 160° C. with removal of butanol. The temperature was increased until 185° C. was reached and the final acid number was 30.

To 400.29 grams polyester was added 74.94 grams undistilled DCPD-A and 1450 milliliters methylene chloride. The solution was chilled to minus 20° C. and held under nitrogen. There was added 209.77 grams bromine dropwise over 43 minutes and post reacted at reduced temperature for one hour. The inhibitor-stabilizer combination was added followed by 227.03 grams styrene.

(b) A comparative formulation was prepared from 57 percent of the polyester, 10.67 percent of the undistilled DCPD-A and 32.33 percent styrene.

(c) A comparative brominated polyester formulation was prepared. To 400.29 grams polyester was added 1500 milliliters methylene chloride. The solution was chilled to minus 20° C. and held under nitrogen. There was added 155.82 grams bromine dropwise over 42 minutes and post reacted at reduced temperature for one hour. The inhibitor-stabilizer combination was added followed by 301.97 grams styrene.

EXAMPLE 9

Each of the compositions of Examples 7 and 8 and the comparative formulations and comparative brominated polyester formulations were tested according to the procedure of Example 5. The results are in Table III.

TABLE III

| Example | Br₂ | Viscosity | HDT | SPI Gel - 84° C. Gel Time | SPI Gel - 84° C. Cure Time | SPI Gel - 84° C. Max. Exotherm | Barcol Hardness | Tensile Strength | Elong. | Flexural Strength |
|---|---|---|---|---|---|---|---|---|---|---|
| 7(a) | 1.254 | 308 | 139 | 4.0 | 7.8 | 138 | 35.6 | 5.285 | 4.2 | 0.9551 |
| 7(b) | — | 62 | 160 | 4.5 | 7.2 | 206 | 39.7 | 6.538 | 2.5 | 1.6129 |
| 7(c) | 0.96 | 78 | 138 | 4.2 | 10.3 | 128 | 10.3 | 2.216 | >10.0 | 0.4924 |
| 8(a) | 1.313 | 191 | 143 | 5.6 | 10.4 | 142 | 14.9 | 5.650 | 8.1 | 0.5148 |
| 8(b) | — | 48 | 163 | 5.5 | 9.6 | 192 | 41.4 | 6.833 | 1.6 | 1.0938 |
| 8(c) | 0.975 | 66 | 152 | 5.5 | 11.0 | 144 | 12.5 | 3.128 | >10.0 | 0.4445 |

EXAMPLE 10

Oxygen Index (OI) values (ASTM D2863-76) were determined for the compositions of Examples 7 and 8. The results are in Table IV.

TABLE IV

| Example | Br$_2$ | OI |
| --- | --- | --- |
| 7(a) | 1.254 | >38.20 |
| 7(b) | — | ATM |
| 7(c) | 0.96 | 34.40 |
| 8(a) | 1.313 | 30.25 |
| 8(b) | — | ATM |
| 8(c) | 0.975 | 27.75 |

All of the nonbrominated polyesters possessed atmospheric OI values indicative of the total combustion in ambient air. All comparative brominated polyester compositions of Examples 7(c) and 8(c) possessed significantly lower OI values than their cobrominated counterparts of Examples 7(a) and 8(a) reflecting their lower percent bromine substitution.

The nonbrominated compositions of Examples 7(b) and 8(b) all burned with black smoke without leaving a residue. Those of Example 7(a) and 8(a) burned with reduced smoke and were extinguished by thick ash formation at values below the OI.

What is claimed is:

1. A process for preparing halogenated compositions of (1) and $\alpha,\beta$-unsaturated polyester containing pendant unsaturated groups, (2) a dicyclpentadienyl ester of an $\alpha,\beta$-unsaturated carboxylic acid and (3) a reactive diluent, said process comprising the reaction of (a) a blend of (1) and (2) in proportions that the total unsaturation of pendant and dicyclopentadienyl unsaturation equals, when halogenated, the amount of halogen desired in said halogenated composition, with (b) about a stoichiometric amount, based on said total non $\alpha,\beta$-unsaturation, of halogen, said reaction conducted at a temperature of less than about 25° C. until halogenation is substantially complete, after which a polymerization inhibitor-stabilizer is added, any solvent removed, followed by the addition of said reactive diluent.

2. The process of claim 1 wherein said halogen is chlorine or bromine or bromine chloride.

3. The process of claim 1 wherein said unsaturated polyester is prepared from dicarboxylic acids, anhydrides or mixtures thereof and a diol or a mixture of polyols.

4. The process of claim 3 wherein said dicarboxylic acid is a mixture of tetrahydrophthalic acid, anhydride or a mixture thereof and maleic acid, anhydride or a mixture thereof.

5. The process of claim 1 wherein said unsaturated polyester is prepared from dicarboxylic acids, anhydrides, or mixtures thereof, a diol or diols and dicyclopentadiene 6. The process of claim 1 wherein said unsaturated polyester is terminated by alkoxyalkyl phosphonate.

7. The process of claim 6 wherein said phosphonate end group is methoxymethyl phosphonate.

8. The process of claim 1 wherein said dicyclopentadienyl ester is dicyclopentadienyl acrylate.

9. The process of claim 1 wherein said dicyclopentadienyl ester is dicyclopentadienyl methacrylate.

10. The process of claim 1 wherein said dicyclopentadienyl ester is dicyclopentadienyl alkyleneoxyalkyl acrylate.

11. The process of claim 1 wherein said dicyclopentadienyl ester is bis(dicyclopentadienyl)fumarate.

12. The process of claim 1 wherein said reactive diluent is styrene.

13. The process of claim 1 wherein inhibitor is t-butyl catechol plus styrene.

14. The process of claim 1 wherein the reaction temperature is less than 0° C.

15. The process of claim 1 wherein the halogenation reaction is conducted in methylene chloride.

16. The process of claim 1 wherein after halogenation, a small amount of an epoxide is added.

17. The process of claim 16 wherein said epoxide is an epoxy resin.

* * * * *